US007688193B2

(12) United States Patent
Nishida et al.

(10) Patent No.: US 7,688,193 B2
(45) Date of Patent: Mar. 30, 2010

(54) OIL LEVEL DETECTION DEVICE FOR INTERNAL COMBUSTION ENGINE

(75) Inventors: Kazutomo Nishida, Wako (JP); Kazumi Miyashita, Wako (JP); Toshikazu Nakamura, Wako (JP); Toru Taniguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 475 days.

(21) Appl. No.: 11/698,037

(22) Filed: Jan. 26, 2007

(65) Prior Publication Data

US 2007/0194941 A1 Aug. 23, 2007

(30) Foreign Application Priority Data

Feb. 10, 2006 (JP) .............................. 2006-033665

(51) Int. Cl.
*G01F 23/68* (2006.01)
(52) U.S. Cl. .................. 340/450.3; 340/623; 73/313; 200/84 C
(58) Field of Classification Search .............. 340/450.3, 340/623; 73/307, 308, 313; 200/84 C; 123/196 S; 184/6.4, 103.1, 103.2
See application file for complete search history.

(56) References Cited

U.S. PATENT DOCUMENTS

| | | | |
|---|---|---|---|
| 3,200,645 A * | 8/1965 | Levins .......................... 73/313 |
| 3,258,968 A | 7/1966 | Woodcock |
| 3,949,360 A * | 4/1976 | Pignata et al. ............ 340/450.3 |
| 4,641,523 A * | 2/1987 | Andreasson ................. 73/313 |
| 5,103,673 A * | 4/1992 | Sawada et al. ................ 73/313 |
| 5,216,421 A | 6/1993 | Sawada et al. |
| 5,872,509 A * | 2/1999 | Kim ........................ 340/450.3 |
| 7,398,682 B2 * | 7/2008 | Magers et al. ................ 73/313 |
| 2003/0155007 A1 | 8/2003 | Hotta et al. |

FOREIGN PATENT DOCUMENTS

| | | |
|---|---|---|
| JP | 56-56143 U | 5/1981 |
| JP | 2006-214756 A | 8/2006 |
| JP | 2006/137501 A2 | 12/2006 |
| WO | 2006/137507 A2 | 12/2006 |

OTHER PUBLICATIONS

European Search Report dated Feb. 3, 2009, issued in corresponding European Patent Application No. 07000362.9.

* cited by examiner

*Primary Examiner*—Davetta W Goins
*Assistant Examiner*—Anne V Lai
(74) *Attorney, Agent, or Firm*—Westerman, Hattori, Daniels & Adrian, LLP

(57) ABSTRACT

An oil level detection device for an internal combustion engine, which comprises: a housing permitting entry therein of oil; a float provided within the housing and vertically movable with the oil entered in the housing; a switch for performing switching operation in response to the vertical movement of the float within the housing; protrusions provided, on the upper surface of the float, for preventing the float from sticking to the ceiling of the housing due to viscosity of the oil; and protrusions provided, on the bottom of the housing, for preventing the float from sticking to the bottom of the housing due to viscosity of the oil.

9 Claims, 10 Drawing Sheets

US 7,688,193 B2

OIL LEVEL DETECTION DEVICE FOR INTERNAL COMBUSTION ENGINE

FIELD OF THE INVENTION

The present invention relates to an improved oil level detection device capable of accurately detecting an excessive fall of an oil level in an internal combustion engine.

BACKGROUND OF THE INVENTION

Among the oil level detection devices for internal combustion engines in practical use today are ones where a float is provided within a housing, oil is introduced into the housing, and an excessive fall of an oil level is indicated to a user or the like when the float has lowered to a predetermined position.

For practical purposes, the conventional oil level detection devices for internal combustion engines have been considered satisfactory if they are constructed to allow the float to be unsusceptible to transitory oil level fluctuations. Examples of such oil level detection devices for internal combustion engines include one that employs a combination of a float and reed switch, as known, for example, from Japanese Utility Model Laid-Open Publication No. SHO-56-56143 (JP-UM-56-056143A).

FIG. 12 hereof is a sectional view explanatory of a fundamental construction of the conventionally-known oil level detection device 200 for an internal combustion engine, which includes: a housing 201 opening downwardly; a shaft 203 extending downward from a ceiling 202 of the housing 201; a float 204 slidably mounted on the shaft 203 and vertically movable (i.e., capable of rising and falling) in accordance with a level of oil 209 in the housing 201; a magnet 205 provided on the float 204; a reed switch 206 built in the shaft 203 to operate in response the magnet 205 approaching the switch 206; and bushes 208 attached to side surfaces 207 of the housing 201 for opening the side surfaces 207.

However, the conventionally-known oil level detection device 200 for an internal combustion engine would present the inconvenience that the float 204 sticks to the ceiling 202 or bottom 211 of the housing 201, due to the viscosity of the oil, preventing the oil level from being determined accurately. Further, in cases where the oil level detection device 200 is applied to a construction or civil engineering machine, such as a rammer or plate compactor, that vibrates greatly during operation, there would arise a possibility of some component parts, such as a reed switch 206, being impaired or damaged by fluctuating movement of the float 204. Such fluctuating movement of the float 204 would also wear the float 204, excessively fluctuate the oil level to be detected and make the float 204 stick to the housing more easily, leading to in false operation of the oil level detection device 200.

Thus, there has been a great demand for an improved oil level detection device for an internal combustion engine which can prevent the float from sticking to the ceiling or bottom of the housing due to the viscosity of the oil and prevent excessive stress from being applied to various component parts due to vibration transmitted from a machine (such as a civil engineering machine producing great vibration) equipped with the internal combustion engine.

SUMMARY OF THE INVENTION

In view of the foregoing prior art problems, it is an object of the present invention to provide an improved oil level detection device for an internal combustion engine which can always accurately determine an oil level by reliably preventing the float from sticking to the ceiling or bottom of the housing due to the viscosity of the oil and which, even where the device is applied to a machine that vibrates greatly, can effectively prevent damage of components parts to achieve a superior vibration resistance and thereby accurate determination of the oil level.

In order to accomplish the above-mentioned object, the present invention provides an oil level detection device for an internal combustion engine, which comprises: a housing permitting entry therein of oil; a float provided within the housing and vertically movable with the oil entered in the housing; a switch for performing predetermined switching operation in response to the vertical movement (i.e., rising/falling) of the float within the housing; and protrusions provided, on the upper surface and/or lower surface of the float or on the ceiling and/or bottom of the housing, for preventing the float from sticking to the housing due to the viscosity of the oil.

By the provision of the protrusions on the upper surface and/or lower surface of the float or on the ceiling and/or bottom of the housing, the oil level detection device of the present invention can reliably prevent the float from sticking to the ceiling and/or bottom of the housing due to the viscosity of the oil, with the result that the oil level can always be accurately determined and hence the reliability of the device can be significantly enhanced.

In a preferred embodiment, the oil level detection device further comprises a resilient member provided, on the ceiling and/or bottom of the housing or on the upper surface and/or lower surface of the float, for lessening an impact caused when the float hits the housing. Thus, the oil level detection device of the present invention can simultaneously implement measures to prevent the sticking and vibration of the float, as a result of which the costs of the oil level detection device can be significantly reduced.

In a preferred embodiment, the protrusions are provided on the resilient member to project from the ceiling and/or bottom of the housing or from the upper surface and/or lower surface of the float. Thus, in this case too, the oil level detection device of the present invention can simultaneously implement the measures to prevent the sticking and vibration of the float, as a result of which the costs of the oil level detection device can be significantly reduced.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
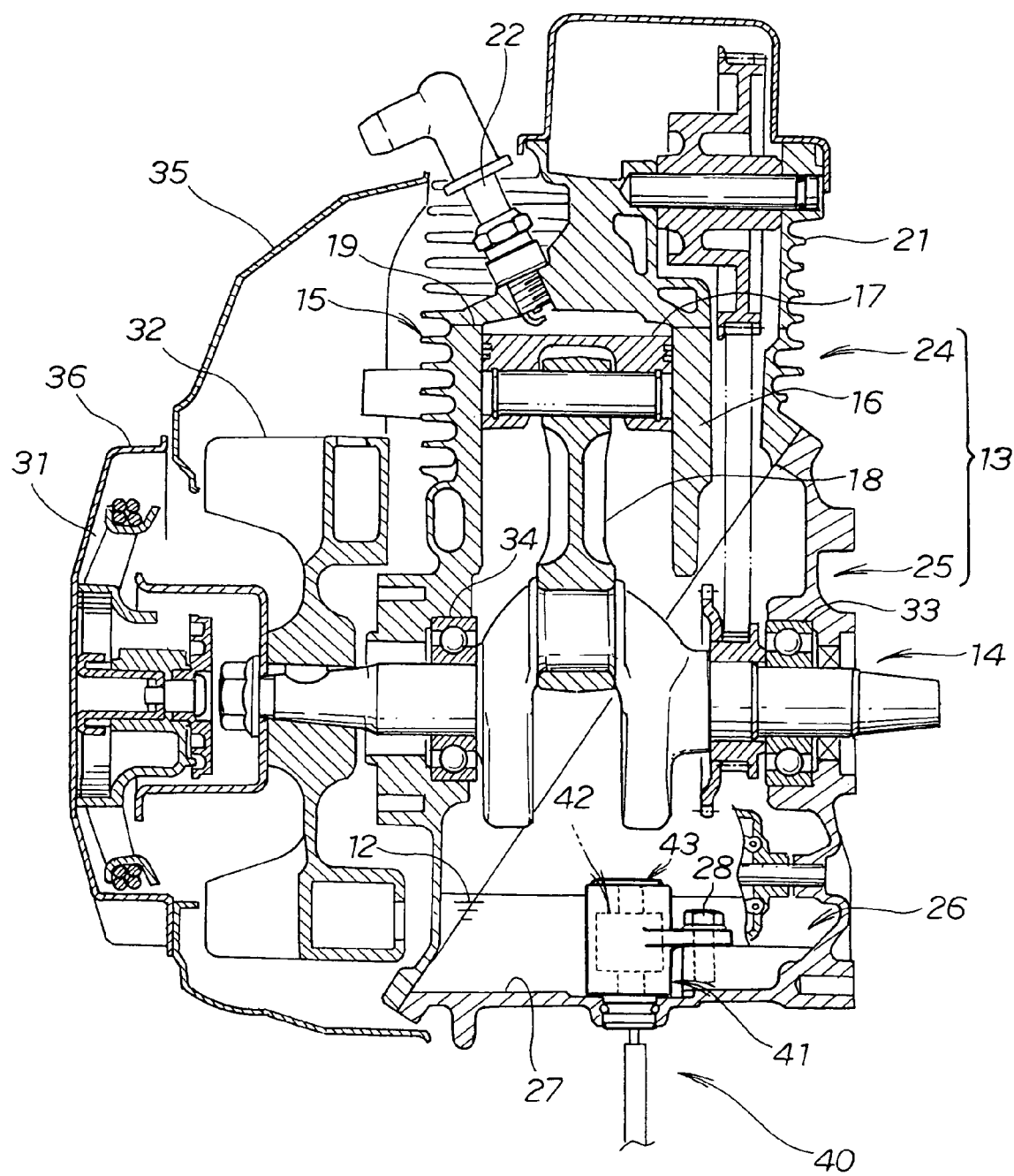
FIG. 1 is a sectional side view of an internal combustion engine employing an oil level detection device in accordance with a first embodiment of the present invention.

FIG. 1 is a sectional side view of an internal combustion engine 10 employing an oil level detection device in accordance with a first embodiment of the present invention. The internal combustion engine (general-purpose engine) 10 is a single-cylinder, air-cooling engine, which comprises: a crankcase 13 having oil (lubricant oil) 12 retained therein; a crankshaft 14 extending horizontally and rotatably connected to the crankcase 13; a cylinder block 15 formed integrally with the crankcase 13; a piston 17 slidably mounted in a cylinder 16 of the cylinder block 15; a connecting rod 18 interconnecting the piston 17 and crankshaft 14; a cylinder head 21 mounted on an opening portion 19 of the cylinder block 15; an ignition plug 22 provided in an upper portion of the cylinder head 21; an air intake valve (not shown) vertically-movably mounted on the cylinder head 21; and an exhaust valve (not shown) vertically-movably mounted on the cylinder head 21.

The crankcase 13 comprises an upper crankcase 24 having the cylinder block 15, and a lower crankcase 25 having an oil pan 26, and the upper crankcase 24 and lower crankcase 25 are attached to each other along their respective oblique surfaces. The crankshaft 14 is also a shaft via one end of which a driving force is output. The crankshaft 14 has a recoil starter 31 and cooling fan 32 mounted on its other end.

The internal combustion engine 10 also includes bearings 33 and 34 for rotatably supporting the crankshaft 14, an engine cover 35 and a recoil starter cover 36, and the oil level detection device 40 of the present invention is employed in the engine 10; hereinafter, the oil level detection device 40 will also be referred to as "internal combustion engine employing the oil level detection device".

Figure 2:
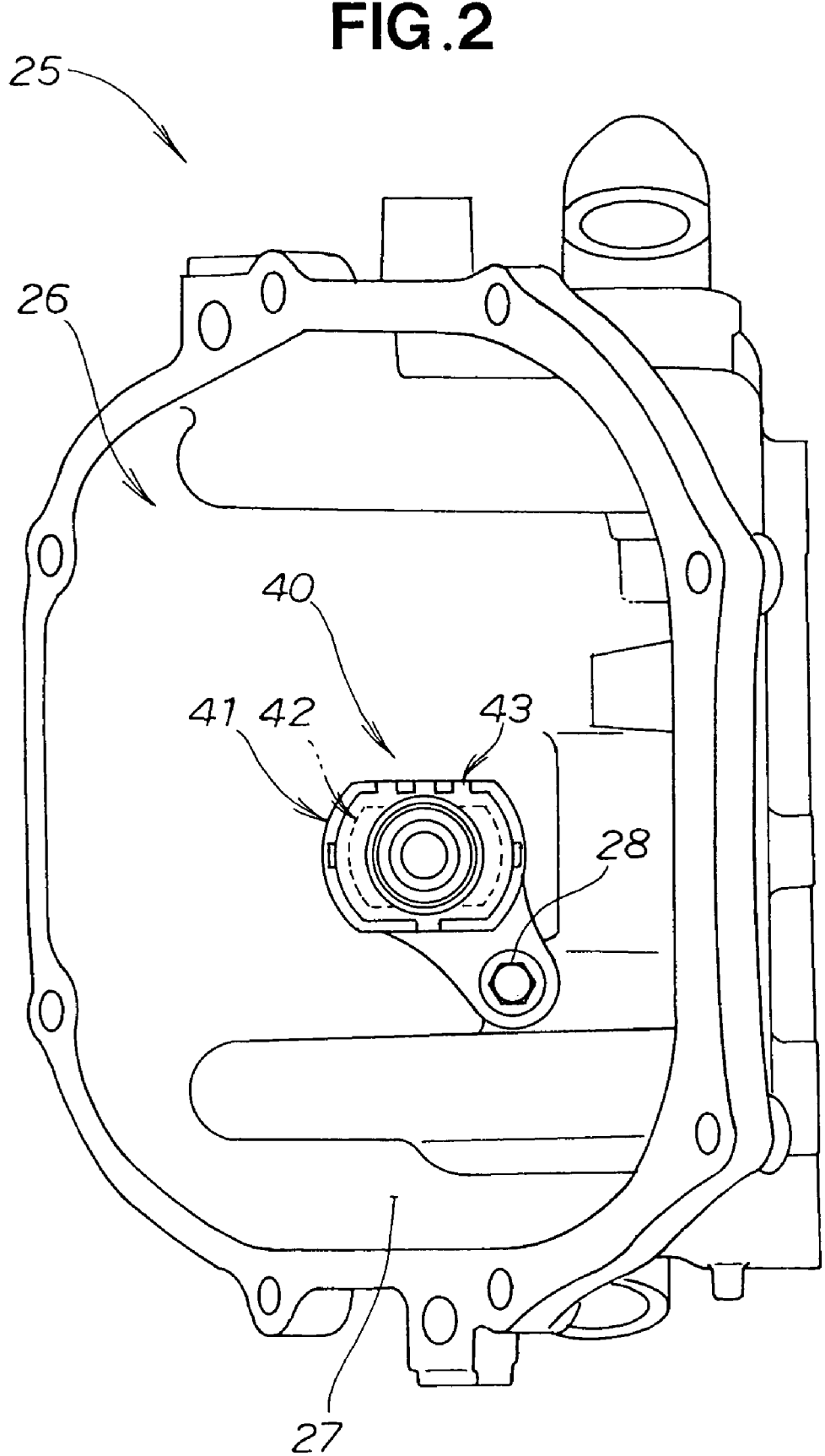
FIG. 2 is a plan view showing a lower crankcase of the internal combustion engine employing the oil level detection device of the present invention.

FIG. 2 is a plan view showing the lower crankcase 25 of the internal combustion engine 10 employing the oil level detection device 40 of the present invention.

The oil level detection device 40 is fixed, by a bolt 28, to a bottom 27 of the lower crankcase 25. As will be later detailed, the oil level detection device 40 is a novel oil alert device which includes arrangements for preventing sticking and vibration of a float assembly of the device 40. Thus, the oil level detection device 40 is suited for use in engines mounted in civil engineering machinery, such as a rammer or plate compactor, that vibrate greatly.

Figure 3:
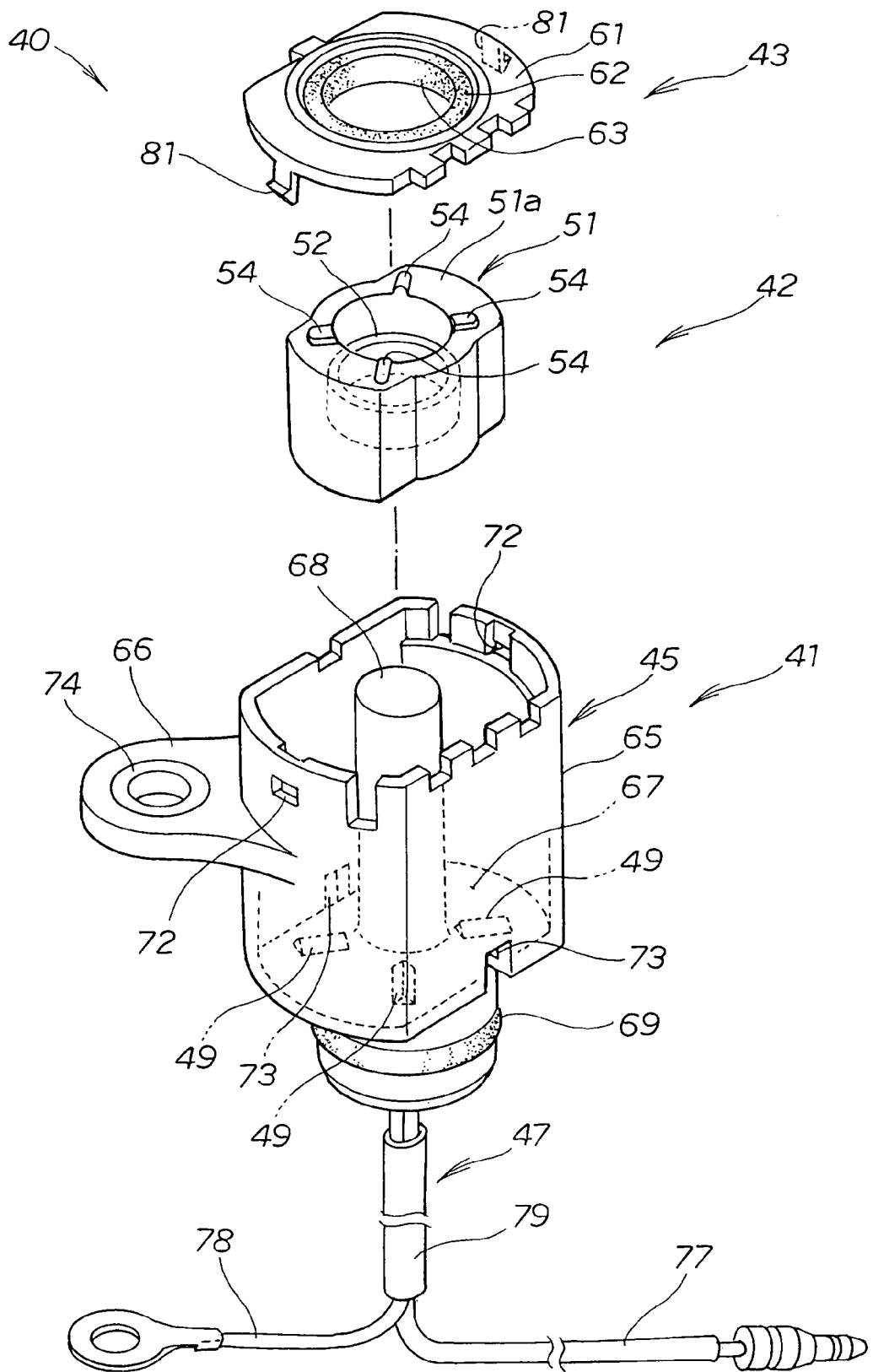
FIG. 3 is an exploded perspective view of the internal-combustion-engine oil level detection device of the present invention.

FIG. 3 is an exploded perspective view of the internal-combustion-engine oil level detection device 40 of the present invention. The oil level detection device 40 comprises a housing assembly 41 mounted in the engine 10 (see FIG. 1), the float assembly 42 vertically-movably disposed within the housing assembly 41, and a cover assembly 43 covering the float assembly 42.

The housing assembly 41 includes a resin-made housing 45, a read switch 46 disposed substantially centrally in the housing 45 (see FIG. 4), and a harness 47 extending from the read switch 46. The housing 45 includes a bottom 67 having a plurality of protrusions 49 partly embedded therein to partly project upward from the upper surface of the bottom 67. The protrusions 49 are each formed of a resilient material, and thus, they will also be referred to as a plurality of resilient members.

The float assembly 42 includes a cylindrical float 51 having an oval shape as viewed in plan, and a magnet 52 provided integrally with a middle portion of the float 51. Protrusions 54 are provided, on an upper surface 51a of the float 51, for preventing the float 51 from sticking to the cover assembly 43 due to the viscosity of the oil 12.

The cover assembly 43 includes a cover (or lid) 61 functioning as a ceiling of the housing 45, and a cover-side resilient member (e.g., anti-vibration rubber) 62 provided, on and along an inner peripheral edge of a central opening portion of the cover 61, for cushioning or lessening an impact on the float 51.

The cover 61 has claws 81 fitted in engaging holes 72 of the housing assembly 41, and the cover-side resilient member 62 is of a ring shape and has an opening 63 through which the oil 12 is introduced.

The housing 45 includes a body section 65 accommodating the float 51, a flange section 66 extending outwardly from the body section 65 and mounted to the bottom 27 of the engine 10 (see FIG. 1), a cylindrical section 68 extending upward from the bottom 67 of the housing 45 to surround the reed switch 46, an oil ring 69 for preventing passage of the oil between the housing 45 and the engine 10, and a lid 71 (see FIG. 4) for holding the reed switch 46 in the cylindrical section 68. The housing 45 further includes oil inflow ports 73, and a collar 74 embedded in the flange section 66 to enhance mounting rigidity of the flange section 66.

Figure 4:
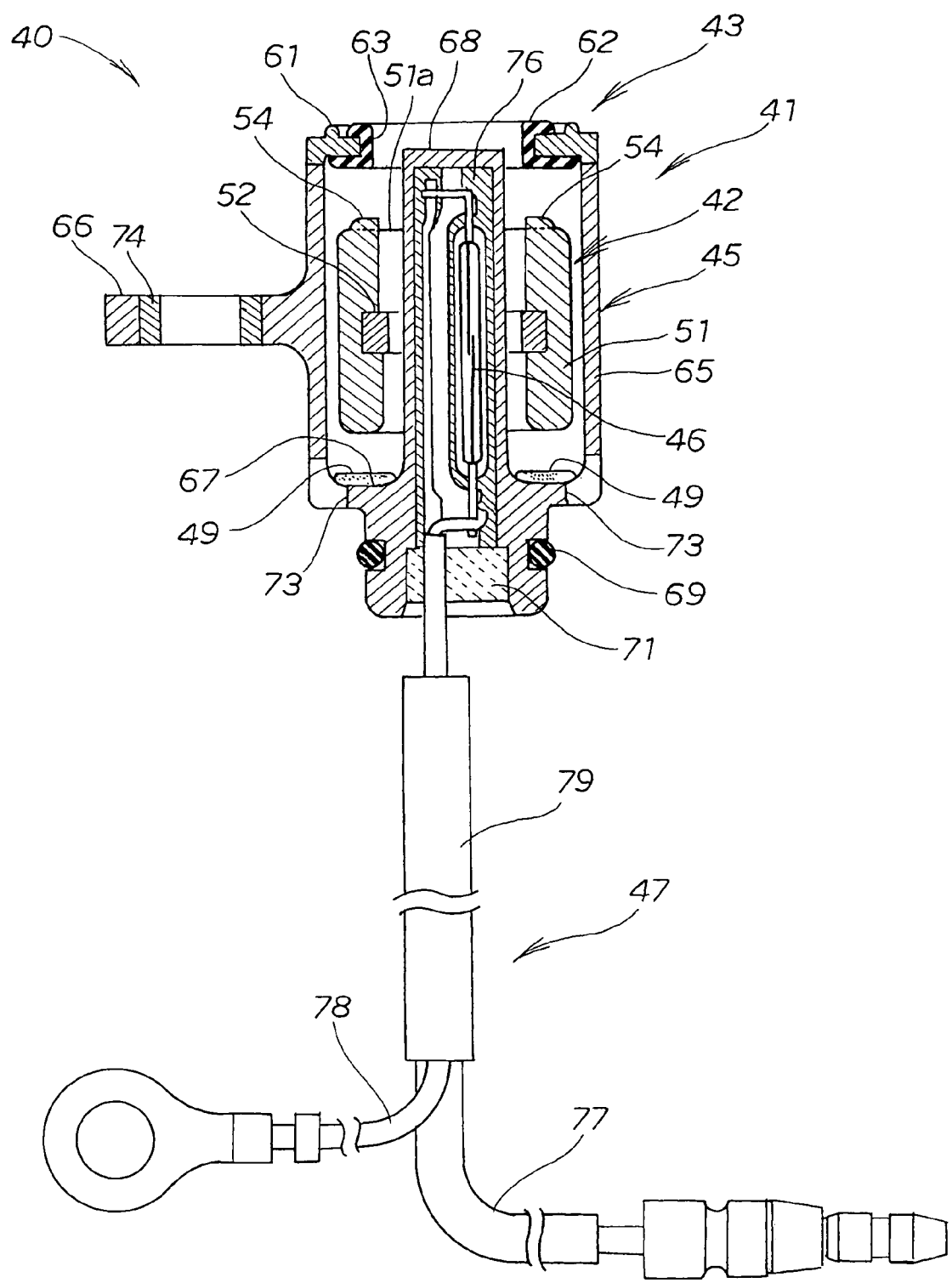
FIG. 4 is a sectional front view of the internal-combustion-engine oil level detection device of the present invention.

FIG. 4 is a sectional front view of the internal-combustion-engine oil level detection device 40 of the present invention.

The reed switch 46 is kept in an OFF state while the oil level is in a normal range, but switched to an ON state when the oil level has fallen below a predetermined threshold value. The reed switch 46 is accommodated in the cylindrical section 68 and fixed in place with silicon resin 76 filled in the cylindrical section 68.

The above-mentioned harness 47 includes a positive (i.e., plus)-side wiring 77 for connection to a positive-side terminal B of a power supply (not shown), a negative (i.e., minus)-side wiring 78 for connection to an earth-side terminal of the power supply, and a tube enclosing these wirings 77 and 78.

Briefly speaking, the oil level detection device 40 comprises the housing 45 permitting entry therein of the oil 12 (see FIG. 1), the float 51 accommodated in the housing 45 and vertically movable (i.e., capable of rising and falling) with the oil 12 entered in the housing 45, and the reed switch 46 is turned on/off in response to the vertical movement of the float 51. The protrusions 54 are provided, on the upper surface 51a of the float 51, for preventing the float 51 from sticking to the ceiling (cover) 61 of the housing 45 due to the viscosity of the oil 12, and the protrusions 49 are provided, on the bottom 67 of the housing 45, for preventing the float 51 from sticking to the bottom 67 of the housing 45 due to the viscosity of the oil 12.

Preventing the float 51 from sticking to the ceiling 61 and bottom 67 due to the viscosity of the oil 12 is preferable in that, by so doing, the oil level can always be accurately detected or determined. By the provision of the protrusions (i.e., upper-float-surface protrusion) 54 and protrusions (i.e., housing-bottom-side protrusions) 49, the oil level detection device 40 can reliably prevent the float 51 from sticking to the ceiling (cover) 61 and bottom 67 of the housing 45 due to the viscosity of the oil 12, with the result that the oil level can always be accurately determined and hence the reliability of the device 40 can be significantly enhanced.

Figure 5:
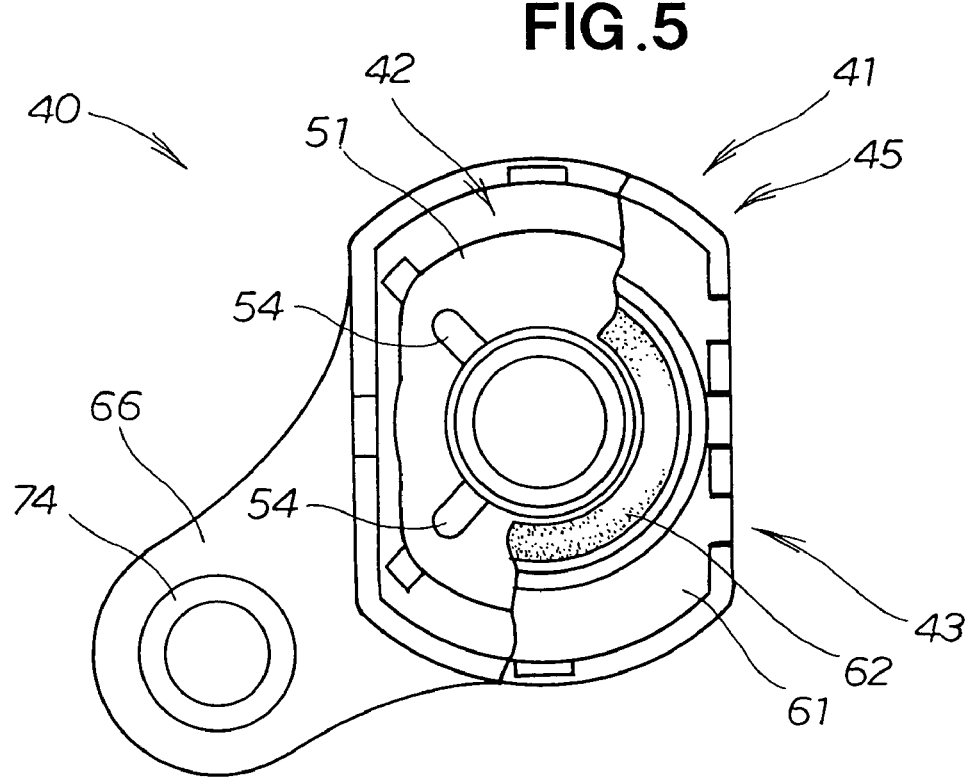
FIG. 5 is a plan view of the internal-combustion-engine oil level detection device of the present invention.
Figure 6:
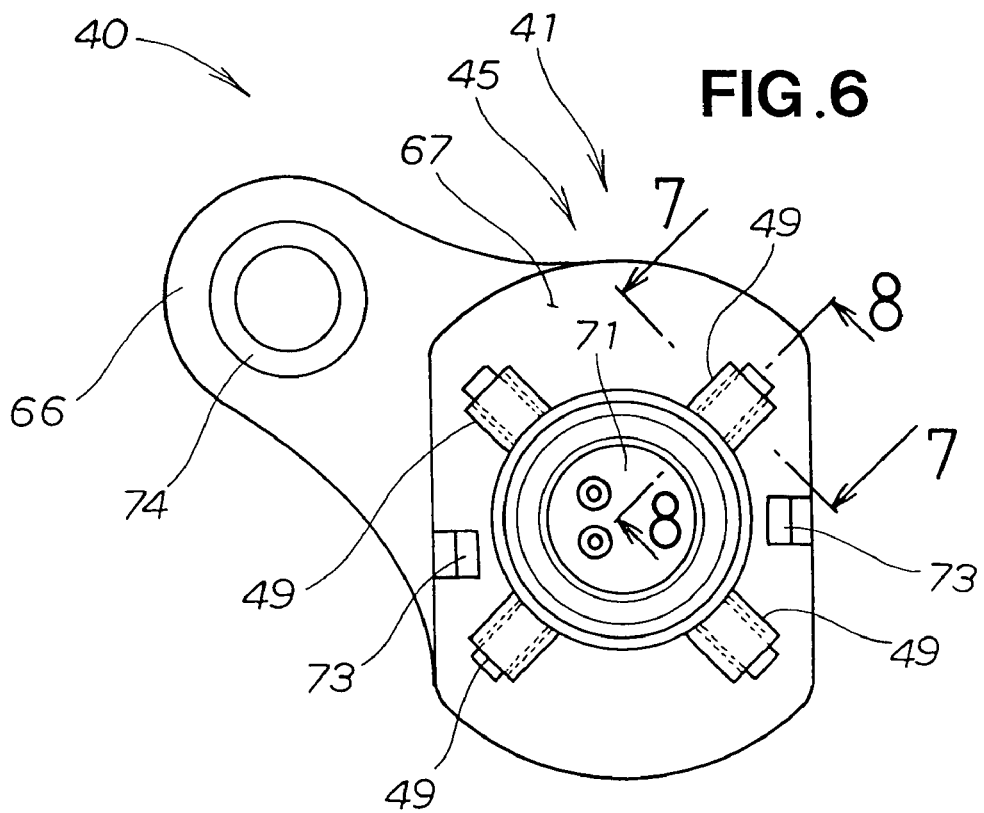
FIG. 6 is a bottom view of the internal-combustion-engine oil level detection device of the present invention.

FIGS. 5 and 6 are a plan view and bottom view, respectively, of the internal-combustion-engine oil level detection device 40 of the present invention.

As shown, the oil level detection device 40 further includes the cover-side resilient member (e.g., anti-vibration rubber) 62 provided on the ceiling (cover) 61 for cushioning an impact imposed on the float 51 when the float 51 hits the ceiling 61, as well as the resilient members (housing-bottom-side protrusions) 49 provided on the bottom 67 for cushioning an impact imposed on the float 51 when the float 51 hits the housing 45.

Such an arrangement for cushioning an impact imposed on the float 51 when the float 51 hits the housing 45 is very advantageous because it can sufficiently protect component parts even in a case where the oil level detection device 40 is applied to a machine that vibrates greatly.

With the resilient member 62 provided on the cover 61 for cushioning an impact on the float 51 when the float 15 hits the ceiling 61 and with the resilient members (housing-bottom-side protrusions) 49 provided on the bottom 67 for cushioning an impact imposed on the float 51 when the float 51 hits the housing 45, the oil level detection device 40 of the present invention can effectively lessen an impact that would be produced due to unnecessary and excessive fluctuating movement of the float 51 in a case where the oil level detection device 40 is applied to a machine that vibrates greatly. Thus, the present invention can provide an improved oil level detection device 40 having a superior vibration resistance.

Further, with the resilient member 62 and the resilient protrusions 49 provided on and projecting from the bottom 67, the oil level detection device 40 can simultaneously implement measures to prevent the sticking and vibration of the float 51, as a result of which the costs of the oil level detection device 40 can be effectively reduced.

Figure 7:
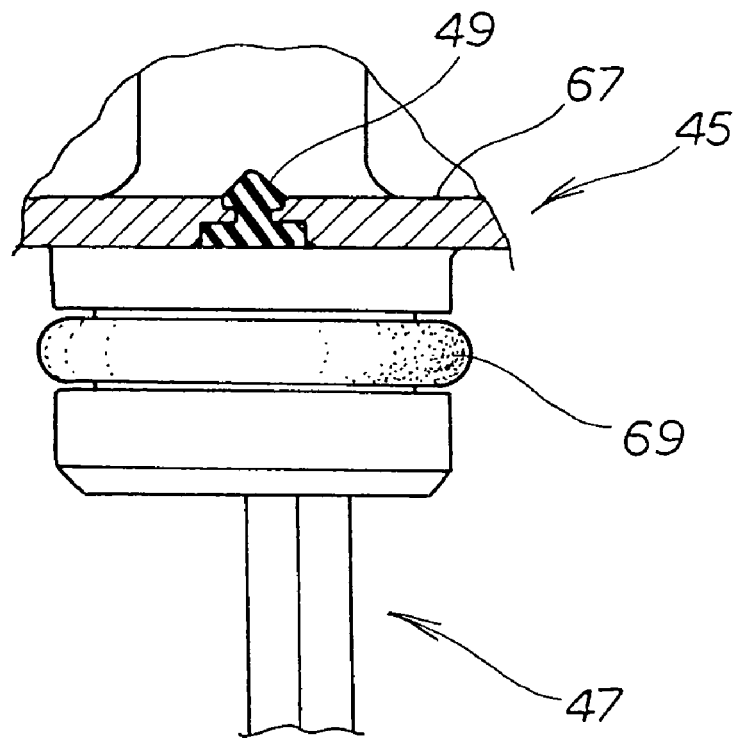
FIG. 7 is a sectional view taken along line 7-7 of FIG. 6.
Figure 8:
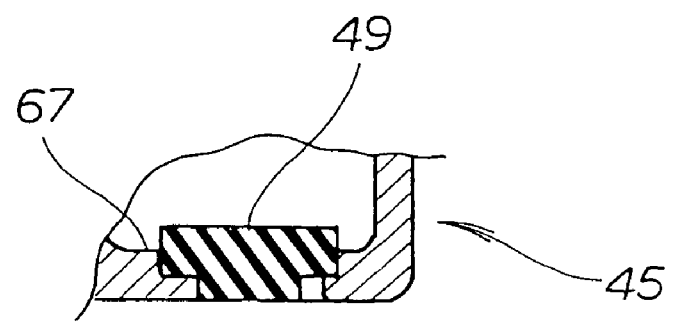
FIG. 8 is a sectional view taken along line 8-8 of FIG. 6.

FIG. 7 is a sectional view taken along line 7-7 of FIG. 6, and FIG. 8 is a sectional view taken along line 8-8 of FIG. 6.

As shown in FIG. 7, each of the resilient protrusions (i.e., bottom-side protrusions) 49 has a substantially-triangular vertical sectional shape so that a predetermined contact portion of the float 51 can contact the resilient protrusion 49 in a linear manner. As shown in FIG. 8, each of the protrusions (i.e., bottom-side protrusions) 49 has a horizontal sectional shape of a substantial rail having a predetermined length.

To implement the measures for preventing the sticking and vibration of the float 51, the predetermined length of the rail-like shape of each of the resilient protrusions 49 may be chosen as necessary. As a result, it is possible to increase design freedom of the internal-combustion-engine oil level detection device 40 of the present invention.

Figure 9:
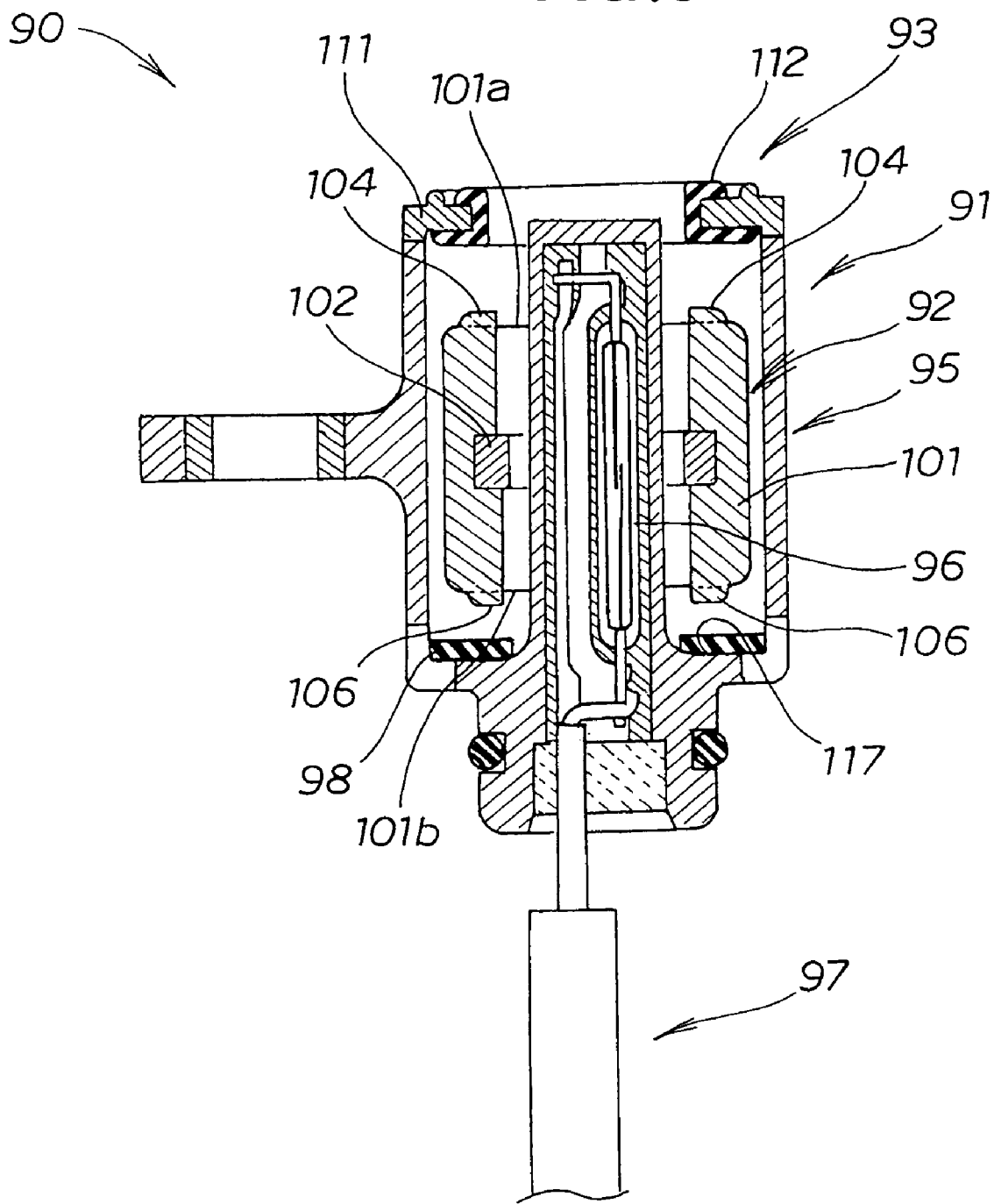
FIG. 9 is a sectional front view of an oil level detection device for an internal combustion engine in accordance with a second embodiment of the present invention.

FIG. 9 is a sectional front view of an oil level detection device for an internal combustion engine in accordance with a second embodiment of the present invention. The oil level detection device 90 according to the second embodiment comprises: a housing assembly 91 mounted in the engine and including a housing 95 permitting entry therein of oil; a float assembly 92 having a float 101 vertically movable with the oil in the housing 95; a cover assembly 93 covering the float assembly 92; a reed switch 96 that is turned on/off in response to the vertical movement of the float 101 and has a harness 97; a flat-plate-shaped resilient member 98 provided on a bottom 117 of the housing 95; a magnet 102 provided integrally with the float 101; a plurality of protrusions (upper-float-surface protrusions) 104 provided on an upper surface 101a of the float 101; a plurality of protrusions (lower-float-surface protrusions) 106 provided on a lower surface 101b of the float 101; and a cover-side resilient member (e.g., anti-vibration rubber) 112 provided on a cover or ceiling 111 of the housing 95.

Namely, the oil level detection device 90 according to the second embodiment is characterized by implementing the measures to prevent the sticking and vibration of the float 101, by means of the flat-plate-shaped resilient member 98 provided on the bottom 117 of the housing 95, the cover-side resilient member (anti-vibration rubber) 112 provided on the cover or ceiling 111 of the housing 95, the plurality of protrusions 104 provided on the upper surface 101a of the float 101 and the plurality of protrusions 106 provided on the lower surface 101b of the float 101.

Figure 10:
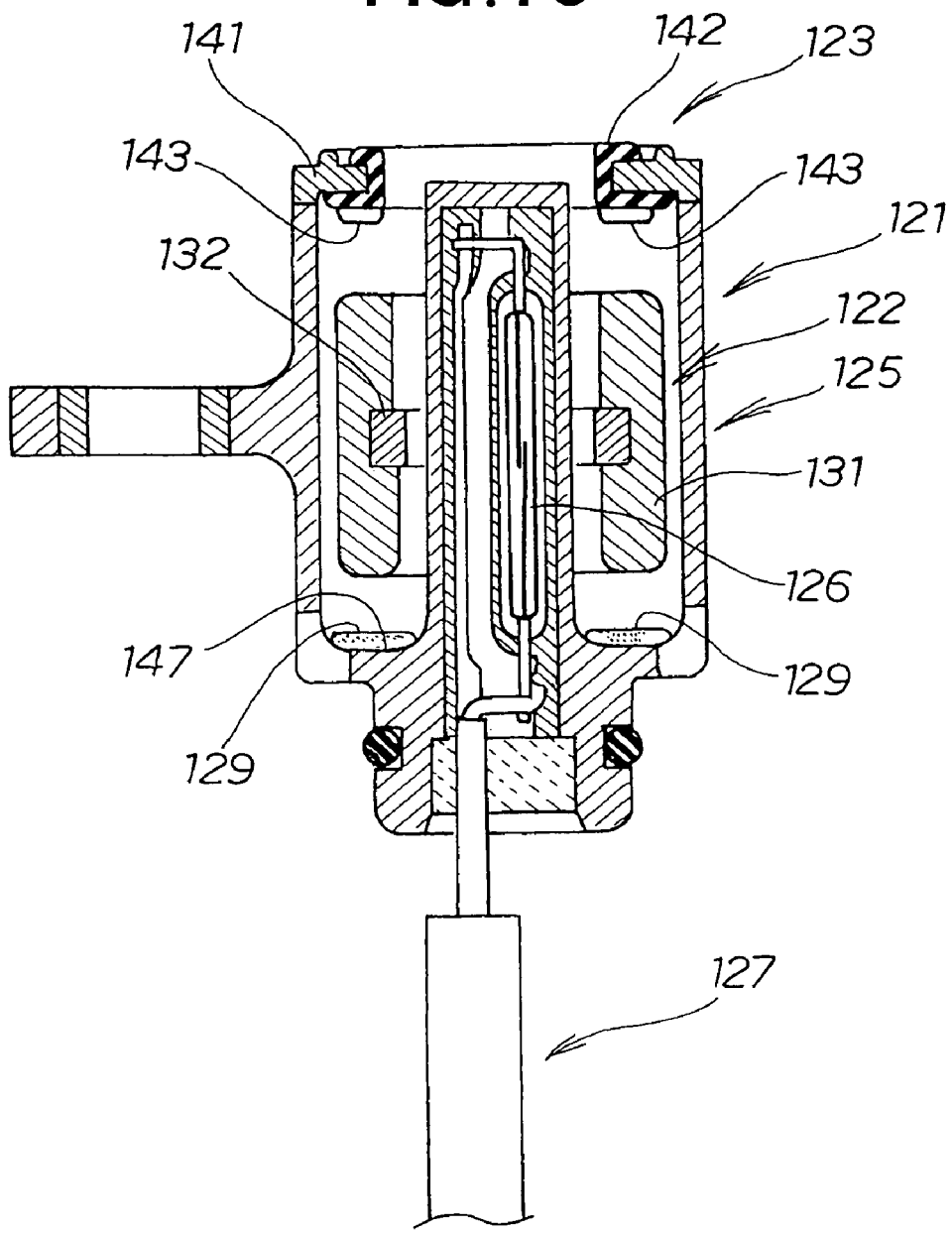
FIG. 10 is a sectional front view of an oil level detection device for an internal combustion engine in accordance with a third embodiment of the present invention.

Further, FIG. 10 is a sectional front view of an oil level detection device for an internal combustion engine in accordance with a third embodiment of the present invention. The oil level detection device 120 according to the third embodiment comprises: a housing assembly 121 mounted in the engine and including a housing 125 permitting entry therein of oil; a float assembly 122 having a float 131 vertically movable with the oil in the housing 125; a cover assembly 123 covering the float assembly 122; a reed switch 126 that is turned on/off in response to the vertical movement of the float 131 and has a harness 127; a plurality of housing-bottom-side protrusions 129 provided on a bottom 147 of the housing 125 (these protrusions 129 are similar to the bottom-side protrusions 49 shown in FIG. 8); a magnet 132 provided integrally with the float 131; cover or ceiling 141 of the housing 125; a cover-side resilient member (anti-vibration rubber) 142 provided on the cover or ceiling 141 of the housing 125; and a plurality of cover-side protrusions 143 provided on the lower surface of the cover-side resilient member 142.

Namely, the oil level detection device 120 according to the third embodiment is characterized by implementing the measures to prevent the sticking and vibration of the float 131, by means of the bottom-side protrusions 129 provided on the bottom 147 of the housing 125, the resilient member 142 provided on the cover or ceiling 141 of the housing 125 and the cover-side protrusions 143 provided on the lower surface of the resilient member 142.

Figure 11:
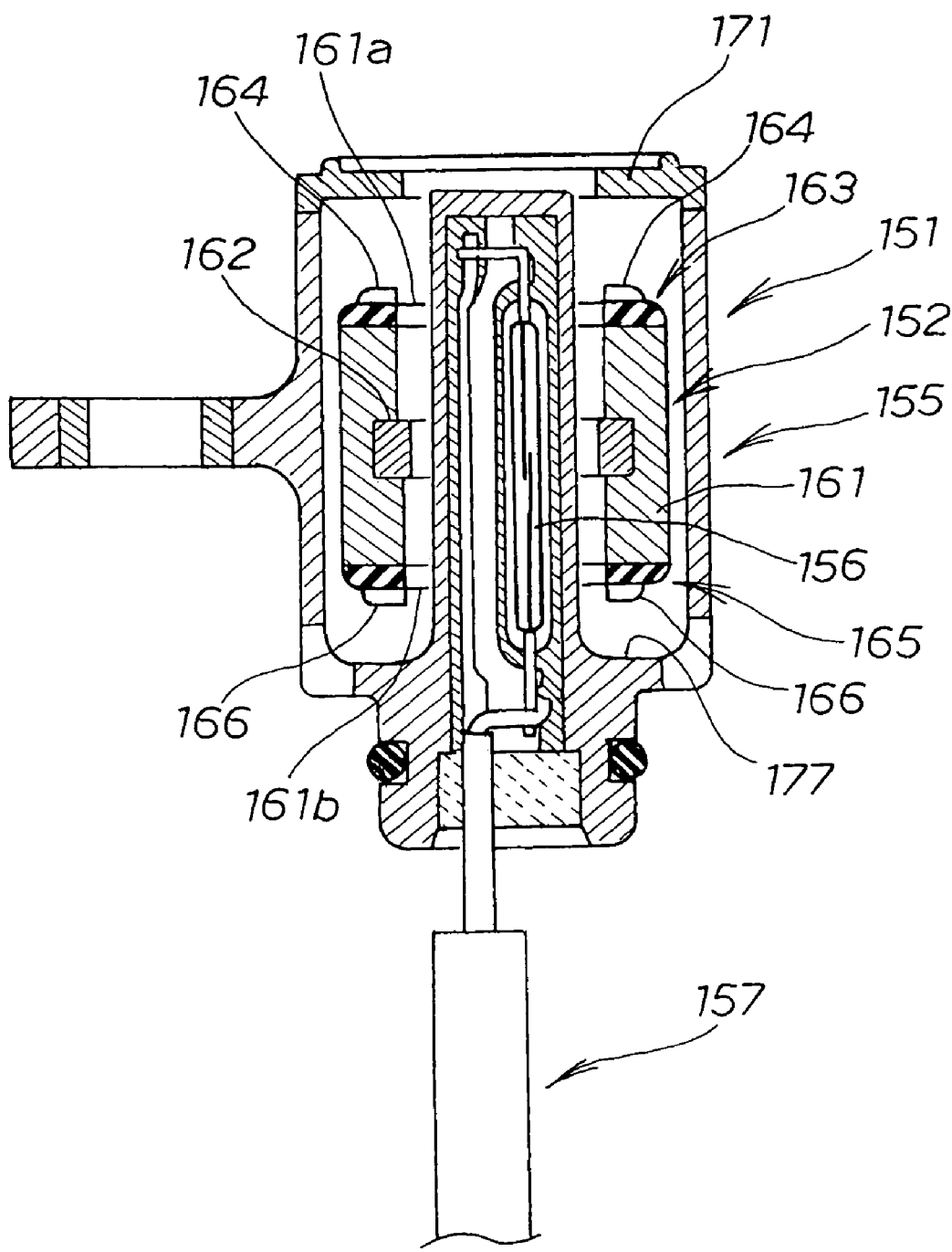
FIG. 11 is a sectional front view of an oil level detection device for an internal combustion engine in accordance with a fourth embodiment of the present invention.
Figure 12:
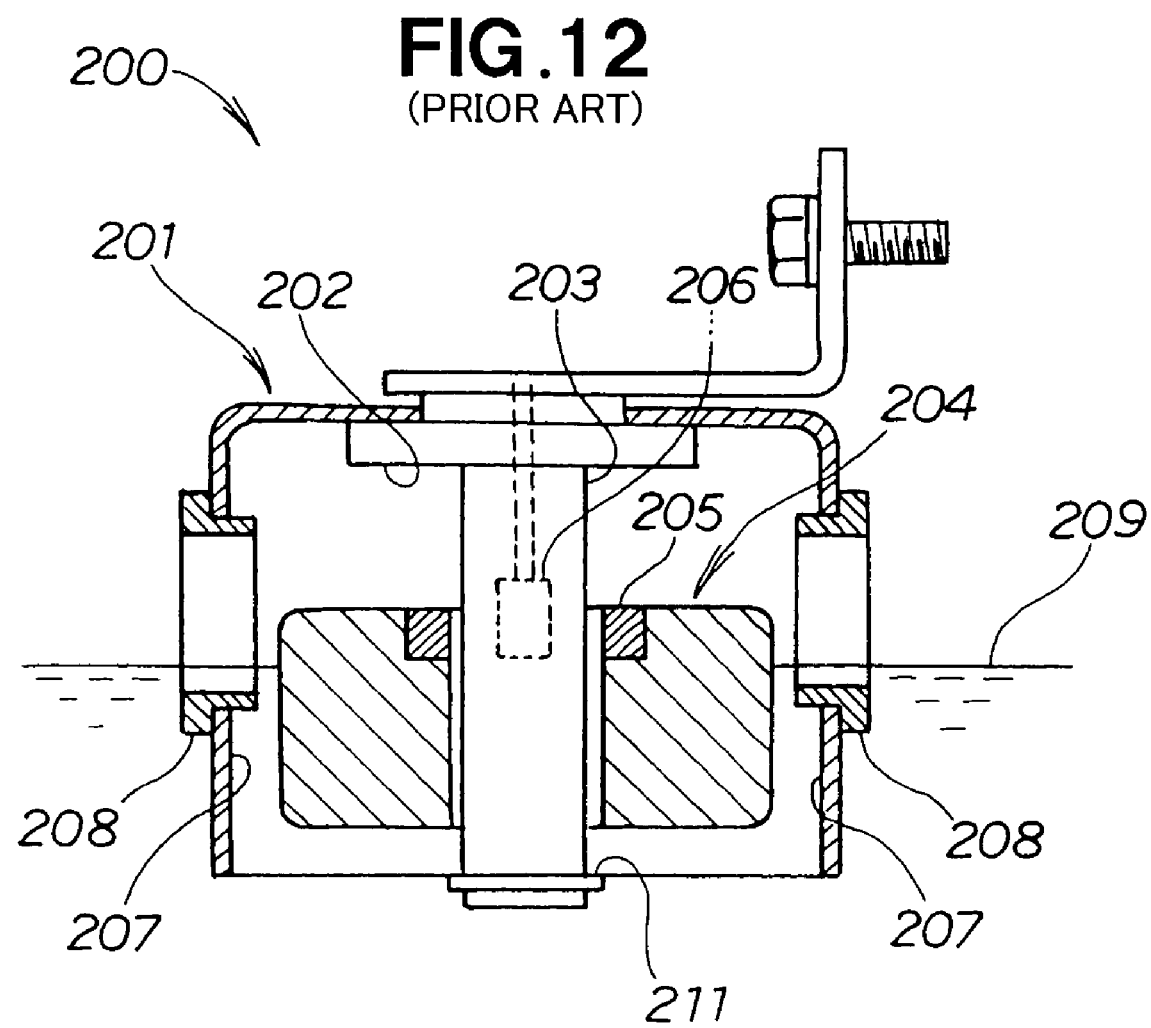
FIG. 12 is a view explanatory of a fundamental construction of a conventionally-known oil level detection device for an internal combustion engine.

FIG. 11 is a sectional front view of an oil level detection device for an internal combustion engine in accordance with a fourth embodiment of the present invention. The oil level detection device 150 according to the fourth embodiment comprises: a housing assembly 151 mounted in the engine and including a housing 155 permitting entry therein of oil; a float assembly 152 having a float 161 vertically movable with the oil in the housing 155; a reed switch 156 that is turned on/off in response to the vertical movement of the float 161 and has a harness 157; an upper resilient member 163 provided on an upper surface 161a of the float 161; a magnet 162 provided integrally with the float 161; a plurality of upper-side protrusions 164 provided on the upper surface of the upper resilient member 163; a lower resilient member 165 provided on a lower surface 161b of the float 161; and a plurality of lower-side protrusions 166 provided on the lower surface of the lower resilient member 165. Reference numeral 171 indicates a cover or ceiling of the housing 155, and 177 a bottom of the housing 155.

Namely, the oil level detection device 150 according to the fourth embodiment is characterized by implementing the measures to prevent the sticking and vibration of the float 161, by means of the upper resilient member 163 provided on the upper surface 161a of the float 161, the plurality of upper-side protrusions 164 provided on the upper surface of the upper resilient member 163, the lower resilient member 165 provided on the lower surface 161*b* of the float 161 and the plurality of lower-side protrusions 166 provided on the lower surface of the lower resilient member 165.

In the oil level detection device of the present invention, as seen in FIGS. 4, 9, 10 and 11, the aforementioned protrusions may be provided on the upper surface and/or lower surface of the float, or on the ceiling and/or bottom of the housing. Further, the aforementioned resilient member may be provided on the ceiling and/or bottom of the housing, or on the upper surface and/or lower surface of the float. Further, the protrusions may be provided on the resilient members to project from the ceiling and/or bottom of the housing, or from the upper surface and/or lower surface of the float. Further, the present invention may use any desired combination of such protrusions and resilient members.

The oil level detection device of the present invention arranged in the above-described manner is very suitable for use in engines mounted on civil engineering or construction machines, such as rammers and plate compactors, that greatly vibrate during operation.

Obviously, various minor changes and modifications of the present invention are possible in light of the above teaching. It is therefore to be understood that within the scope of the appended claims invention may be practiced otherwise than as specifically described.

What is claimed is:

1. An oil level detection device for an internal combustion engine, comprising:
    a housing permitting entry therein of oil through an opening in a ceiling of said housing;
    a float provided within said housing and vertically movable with the oil entered in said housing;
    a switch disposed substantially centrally in the housing for performing switching operation in response to vertical movement of said float within said housing; and
    protrusions provided, on an upper surface and/or lower surface of said float or on a ceiling and/or bottom of said housing, for preventing said float from sticking to said housing due to viscosity of the oil.

2. The oil level detection device of claim 1, which further comprises a resilient member provided, on the ceiling and/or bottom of said housing or on the upper surface and/or lower surface of said float, for lessening an impact caused when said float hits said housing.

3. The oil level detection device of claim 2, wherein said protrusions are provided on said resilient member to project from the ceiling and/or bottom of said housing or from the upper surface and/or lower surface of said float.

4. The oil level detection device of claim 1, wherein said switch is a reed switch.

5. The oil level detection device of claim 1, wherein said switch is in an OFF state while the oil level is in a normal range and is in an ON state when the oil level falls below a predetermined threshold value.

6. An oil level detection device for an internal combustion engine, comprising:
    a housing permitting entry therein of oil through an opening in a ceiling of said housing;
    a float provided within said housing and vertically movable with the oil entered in said housing;
    a switch for performing switching operation in response to vertical movement of said float within said housing;
    protrusions provided on a lower surface of said float for preventing said float from sticking to a bottom of said housing due to viscosity of the oil; and
    a resilient member provided on said bottom of said housing for lessening an impact caused when said float hits said housing.

7. The oil level detection device of claim 6, wherein said float further comprises protrusions provided on an upper surface of said float for preventing said float from sticking to an upper surface of said housing.

8. An oil level detection device for an internal combustion engine, comprising:
    a housing permitting entry therein of oil through an opening in a ceiling of said housing;
    a float provided within said housing and vertically movable with the oil entered in said housing;
    a switch for performing switching operation in response to vertical movement of said float within said housing; and
    protrusions provided on a bottom of said housing for preventing said float from sticking to said housing due to viscosity of the oil.

9. The oil level detection device of claim 8, which further comprises a resilient member provided on the bottom of said housing for lessening an impact caused when said float hits said housing, wherein said protrusions are provided on said resilient member to project from said bottom of said housing.

* * * * *